(12) United States Patent
Demjanenko et al.

(10) Patent No.: US 6,633,604 B1
(45) Date of Patent: Oct. 14, 2003

(54) METHOD OF IMPROVING ECHO CANCELLER TRAINING IN MODEMS AND OF DISCOVERING CHARACTERISTICS OF A PCM CHANNEL

(75) Inventors: Victor Demjanenko, Pendleton, NY (US); Frederic J. Hirzel, Clinton Township, MI (US)

(73) Assignee: Vocal Technologies, Ltd., Buffalo, NY (US)

(*) Notice: Subject to any disclaimer, the term of this patent is extended or adjusted under 35 U.S.C. 154(b) by 0 days.

(21) Appl. No.: 09/132,600

(22) Filed: Aug. 11, 1998

Related U.S. Application Data
(60) Provisional application No. 60/055,417, filed on Aug. 11, 1997.

(51) Int. Cl.[7] .................................................. H04B 1/38
(52) U.S. Cl. ........................................ 375/222; 375/242
(58) Field of Search ................................. 375/222, 242, 375/243, 256, 285, 296, 286; 370/286, 289, 293; 379/406; 455/570

(56) References Cited

U.S. PATENT DOCUMENTS

| | | | | |
|---|---|---|---|---|
| 5,369,500 A | * | 11/1994 | Jacobs .......................... 358/406 |
| 5,515,398 A | | 5/1996 | Walsh et al. |
| 5,671,251 A | * | 9/1997 | Blackwell et al. ........... 375/222 |
| 5,949,819 A | * | 9/1999 | Bjarnason et al. .......... 375/222 |
| 5,953,374 A | * | 9/1999 | Yeh .............................. 375/242 |
| 5,956,651 A | * | 9/1999 | Willkie et al. ............... 455/553 |
| 5,966,636 A | * | 10/1999 | Corrigan et al. ............. 725/116 |
| 5,970,100 A | * | 10/1999 | Olafsson et al. ............. 375/296 |
| 5,999,828 A | * | 12/1999 | Sih et al. ...................... 455/570 |
| 6,157,678 A | * | 12/2000 | Wei ............................... 375/243 |
| 6,195,414 B1 | * | 2/2001 | Simmons et al. ............. 379/22 |
| 6,198,776 B1 | * | 3/2001 | Eyuboglu et al. ........... 375/286 |
| 6,252,911 B1 | * | 6/2001 | Gatherer et al. ............. 375/265 |
| 6,327,301 B1 | * | 12/2001 | Demjanenko et al. ...... 375/222 |
| 6,343,126 B1 | * | 1/2002 | Stelman ....................... 379/399 |
| RE37,569 E | * | 3/2002 | Ayanoglu et al. ........... 341/144 |
| RE37,571 E | * | 3/2002 | Funke et al. ................. 340/3.7 |
| 6,480,549 B1 | * | 11/2002 | Hirzel et al. ................. 375/242 |

* cited by examiner

*Primary Examiner*—Emmanuel Bayard
(74) *Attorney, Agent, or Firm*—Simpson & Simpson, PLLC

(57) ABSTRACT

A method of discovering characteristics of a PCM channel between a first PCM modem and a second PCM modem, comprising the steps of creating a PCM representation of a probing tone ensemble, where the probing tone ensemble comprises one or more tones, transmitting the PCM representation of the probing tone ensemble from the first PCM modem to the second PCM modem, receiving the PCM representation of the probing tone ensemble by the second PCM modem; and, processing the PCM representation of the probing tone ensemble to determine characteristics of the PCM channel. The invention also comprises a method of improving echo canceller training of a modem comprising generating an echo canceller training reference signal modifying the echo canceller training reference signal sending the modified echo canceller training reference signal into a channel, receiving an echo of the modified echo canceller training signal; and, processing the echo canceller training reference signal and the received echo of the modified echo canceller training reference signal.

20 Claims, 2 Drawing Sheets

METHOD OF IMPROVING ECHO CANCELLER TRAINING IN MODEMS AND OF DISCOVERING CHARACTERISTICS OF A PCM CHANNEL

Applicant hereby claims the benefit under 35 U.S.C. §119(e) of U.S. Provisional Application Ser. No. 60/055,417, filed Aug. 11, 1997, which is incorporated herein by reference.

FIELD OF THE INVENTION

This invention relates generally to modem technology, more particularly to PCM modems, and, more specifically, to a method of improving echo canceller training in modems and of discovering characteristics of a PCM channel.

BACKGROUND OF THE INVENTION

The PCM downstream signal is transmitted by the digital PCM modem and received by the analog PCM modem. The analog PCM modem discovers channel impairments experienced by the PCM downstream signal and adapts its receiver to minimize these impairments. As part of the adaptation process, the analog PCM modem sends transmit parameters to the digital PCM modem. The digital PCM modem subsequently uses these parameters when transmitting PCM downstream data.

The impairments experienced by the PCM downstream signal are generally classified as digital and analog channel impairments. The known impairments on the downstream include any combination of the following:

Digital Impairments
  A. Digital pads
  B. Robbed bit signaling
  C. Code conversions
Analog Impairments
  A. Sample timing recovery
  B. Channel frequency impairments including spectral nulls (DC)
  C. Harmonic distortion inversely proportional to frequency
  D. Single frequency interference at primarily 50 Hz and 60 Hz
  E. Additive receiver noise Compensation for digital impairments is accomplished by treating the impairments as a set transformation of primary symbols produced by the digital PCM transmitter to secondary symbols represented by the analog voltages on the output of the CO digital to analog converter. This set transformation only preserves the monotonic nature of the PCM symbols. Compensation for the digital impairments involve identification of the primary to secondary set transformation and inhibition of selected transmit symbols such that all primary symbols produce unique secondary symbols. This inhibition can be either alliterative or procedural. The analog PCM modem can send a list of valid and/or invalid primary symbols to the digital PCM modem or a code, such as minimal constellation spacing, which inhibits transmission of certain primary symbols.

Compensation of analog impairments involves primarily training adapti ve components within the analog PCM receiver. Impairments compensated in this fashion include sample timing recovery, channel frequency compensation and single frequency injection. Compensation for spectral nulls, insufficient high frequency response and inversely proportional harmonic distortion is accomplished by creating PCM symbols with a non-white spectral shape. Once the desired transmit spectral shape has been determined; the analog PCM modem sends parameters to the digital PCM modem, which will subsequently result in transmission of the desired spectrum.

Additionally, the presence of receiver noise may require increasing the spacing between PCM transmit symbols. Once discovered, this spacing increase can be considered as a transmit set reduction and can be included in, or combined with, transmit symbol inhibition of digital impairment compensation.

In addition to the compensation and training of the receiver for the digital and analog impairments of the downstream signal, the analog PCM modem receiver traditionally compensates for an echo of the signal it is transmitting. Once in data mode, the analog PCM modem transmitter does not transmit a signal with the same bandwidth as it is receiving. Without the knowledge of the spectral response of the echo outside the bandwidth to which the echo canceller was trained, the echo canceller will interfere with the reception of a wider bandwidth signal such as the downstream PCM signal.

What is needed, then is a method of discovering the characteristics of a PCM channel. What is also needed is a method of echo cancellation that can be trained with a suitable wideband signal in order to train for the wider bandwidth which the receiver is expected to operate with. Use of such a wideband signal allows convergence of the echo canceller over the frequency spectrum comparable to that which it will be receiving in the downstream PCM signal.

SUMMARY OF THE INVENTION

Figure 1:
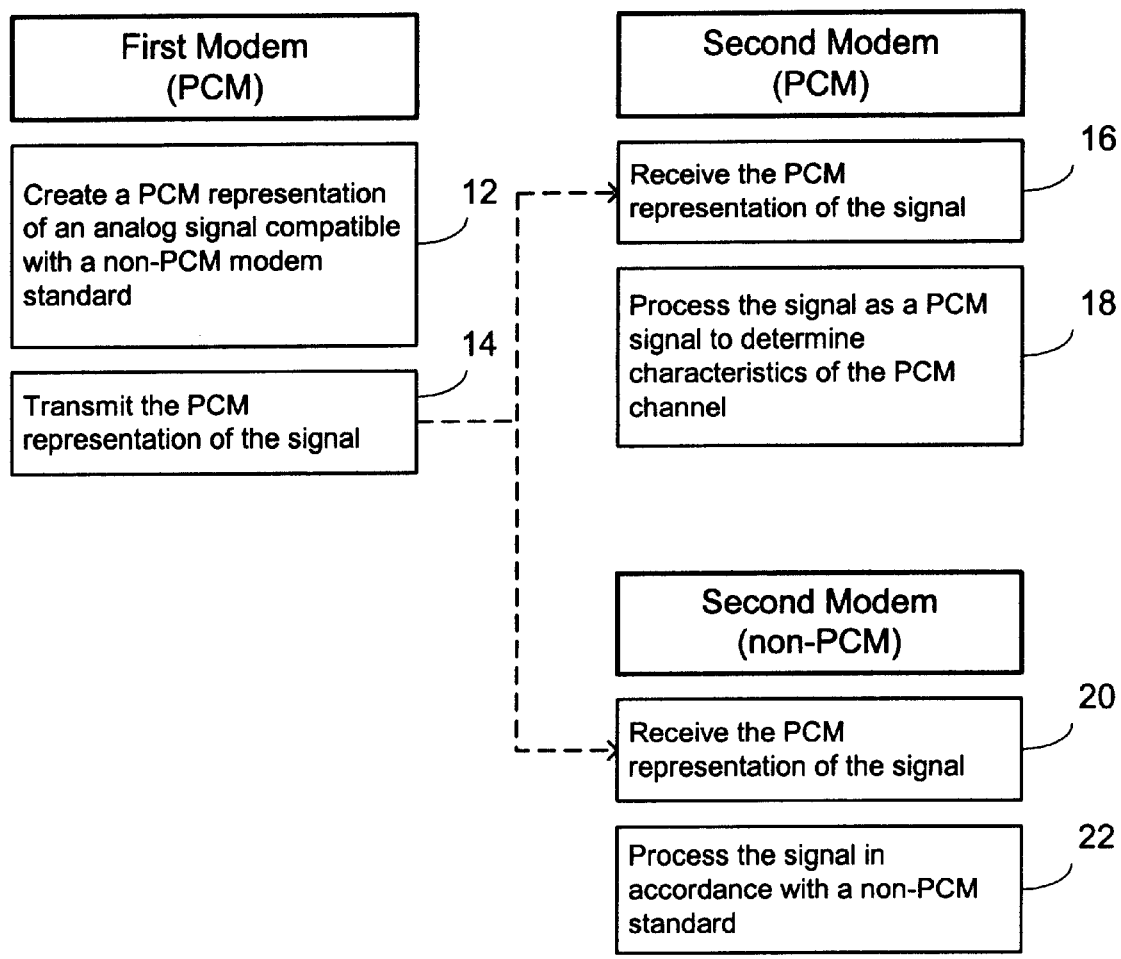
FIG. 1 shows a method in accordance with a first preferred embodiment.
Figure 2:
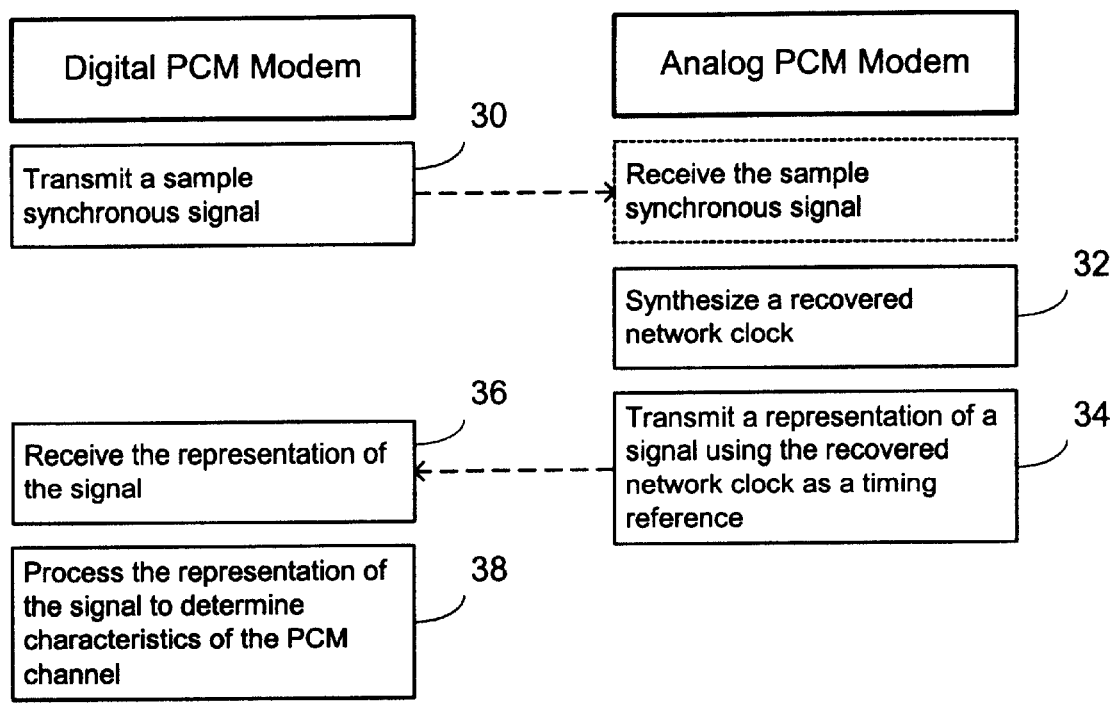
FIG. 2 shows a method in accordance with a second preferred embodiment.

The present invention provides a method of discovering characteristics of a PCM channel between a first PCM modem and a second PCM modem by creating a PCM representation of a probing tone ensemble, where the probing tone ensemble comprises one or more tones, transmitting the PCM representation of the probing tone ensemble from the first PCM modem to the second PCM modem, receiving the PCM representation of the probing tone ensemble by the second PCM modem, and, processing the PCM representation of the probing tone ensemble to determine characteristics of the PCM channel. The invention also comprises a method of improving echo canceller training of a modem comprising generating an echo canceller training reference signal modifying the echo canceller training reference signal sending the modified echo canceller training reference signal into a channel, receiving an echo of the modified echo canceller training signal; and, processing the echo canceller training reference signal and the received echo of the modified echo canceller training reference signal.

A general object of the invention is to provide a method of discovering characteristics of a PCM channel.

Another object of the invention is to provide a method of echo cancellation training of a modem.

Another object is to provide a method of discovering characteristics of a PCM channel and of echo cancellation training of a modem that is compatible with the V.34 modem standard.

These and other objects, features and advantages of the present invention will become readily apparent to one having ordinary skill in the art upon a reading of the following specification and claims.

DETAILED DESCRIPTION OF THE PREFERRED EMBODIMENT

It should be understood at the outset that the discovery method described and claimed herein pertains to PCM modem channel, whereas the echo cancellation training described and claimed herein is not so limited, i.e., it pertains to any type of modem channel. As used herein, the abbreviation V.34 refers to the ITU-T (International Telecommunications Union—Telecommunication Standardization Sector) standard entitled, "A Modem Operating Data Signaling Rate Of Up To 28,800 bits/s For Use On The General Switched Telephone Network And On Leased Point-To-Point 2-Wire Telephone-Type Circuits". (September, 1994). U.S. Pat. No. 5,515,398 is hereby incorporated by reference.

PCM Downstream Discoveries

To compensate for the PCM downstream impairments, the analog PCM modem may minimally discover the following channel parameters:

A. Receive symbol timing recovery information

B. Primary to secondary symbol set transformation

C. Analog channel spectrum

D. Analog low frequency to harmonic distortion relationship

E. Presence of single frequency interference

F. Analog noise spectrum

Receive symbol timing recovery techniques are well known and should be discovered first. After adapting to receive symbol timing, the channel should be equalized and the PCM symbol set transformation discovered. This process of equalization and set transformation is interrelated, since without channel equalization, the set transformation cannot be found; and without proper decisions, the channel equalization cannot be fully realized. Furthermore, the presence of other analog impairments may complicate the process. To isolate only the channel response and PCM symbol set transformation, a bandlimited known signal, without significant low or high frequencies can be sent by the digital PCM modem.

Assuming the PCM symbol set transformation can be discovered, a full spectrum signal can be sent by the digital PCM modem to complete the discovery process. As is conventional for echo canceling modems, the PCM downstream receiver training should occur without the presence of the upstream signal. When the upstream signal is being trained, the analog PCM modem can determine the analog receive noise spectrum.

Further PCM downstream receive discovery occurs when both the downstream and upstream signals are simultaneously present. Analogous to V.34 training, the half-duplex training is known to Phase 3 signaling and the training when both signals are present is referred to as Phase 4 signaling.

V.34 provides a preceding training phase, Phase 2 signaling, to discover information needed before attempting Phase 3 signaling. This signaling is comprised of a split-band full-duplex modulation sections together with half-duplex probing sequences. In a preferred embodiment it is desirable to preserve the Phase 2 V.34 signaling as a mechanism for interoperability with V.34 modulation on channels that cannot support PCM downstream signals. As such, the primary discovery of Phase 2, in respect to PCM modems, is to determine the acceptableness of the PCM downstream channel.

Modified Phase 2 Signaling

Several minor changes to Phase 2 V.34 signaling can extend this signaling such that it provides many benefits to PCM modems while maintaining interoperability with V.34 modems. In particular, the following additional discoveries can be performed:

A. Receive symbol timing recovery information

B. Preliminary primary to secondary symbol set transformation

C. Preliminary analog channel spectrum characteristics

D. Analog low frequency to harmonic distortion relationship

E. Presence of single frequency interference

These additional discoveries can be accomplished through a small number of modifications of V.34 Phase 2 signaling, namely:

A. The timing of the Phase 2 PCM downstream signaling should be sample synchronous;

B. The arithmetic of the Phase 2 PCM downstream signaling should explicit;

C. The addition of signals to Phase 2 PCM downstream signaling beyond the frequency range of those required for Phase 2 V.34 signals.

Each of these modifications, their use and purpose, is described below.

A. Sample Synchronous Phase 2 PCM Downstream Signaling

The V.34 specification allows the generation of QAM (quadrature amplitude modulation) and probing signals to be within 0.01% of nominal frequencies. This requirement is intended to allow for deviation of a local transmit clock when producing these signals. It appears from the specification that solutions may implement these Phase 2 signals with only a casual relationship to their transmit sample rate.

It is doubtful if any existing V.34 modems produce Phase 2 transmit signals asynchronous to their sample clock. As such, it would be a minor modification to existing solutions to require that some or all of the PCM downstream Phase 2 signals be generated strictly synchronous with the PCM downstream sample clock.

For example, V.34 probing is comprised of 21 tones, each a multiple of 150 Hz. Three periods of this probing sequence can be specified as constituting exactly 160 PCM transmit symbols. This sequence is 20 ms in length. The signal L1, which in V.34 is 160 ms in length, would now be specified as 8 repetitions of the 160 sample PCM sequence. The signal L2, which must be produced for at least 500 ms, is now specified as at least 25 repetitions of the 160 sample sequence.

Requiring strictly synchronous behavior of the probing sequence allows for both accurate sample timing recovery and better channel spectrum discovery. Because of the increased accuracy of the channel spectrum discovery, harmonic distortions can also be discovered.

Furthermore, strictly synchronous probing sequences greatly aid in the identification of certain analog impairments, intermediate or local analog lines with frequency offset or other frequency sensitive characteristics.

B. Explicit arithmetic Phase 2 PCM Downstream Signaling

To yield the maximum benefit of the PCM downstream probing, the arithmetics of transmit level and PCM quantization should be explicit and fully specified. Fixing the transmit level to be a known level, perhaps by specification (−12 dBm) or by parameter in the INFO0 packet, together with sample synchronous generation, produces a fixed known 160 sample primary set sequence at the digital PCM transmitter. This sequence can then be used, in addition to previous benefits, to effect a preliminary discovery of the primary to secondary symbol set transformation. Once this transformation is known, all discoveries discussed previously can be made even more accurately and hence more relevant.

Preliminary investigation indicates strictly synchronous sample and explicit arithmetic requirements on the PCM downstream Phase 2 probing signal should be adequate for identification of undesirable intra-network recodings, such as that by ADPCM and CELP. It seems reasonable though, that any recoding which produces only additional digital symbol set transformation is potentially undetectable.

One solution to this problem is to slightly "dither" the least significant bit of some transmit PCM samples. The dithering is used to create multiple "sets" of 160 sample probing signals. These discovered dithered sets are then used to identify damaging intra-network recoding operations.

C. Additional Phase 2 PCM Downstream Signals

Additional frequencies, below the lowest probing frequency of 150 Hz and above the highest probing frequency of 3750 Hz, may be included in the PCM downstream probing signal. The use of these additional signals would be used to provide additional channel spectrum discoveries as well as more detailed harmonic distortion information. Unfortunately, the addition of these signals produces a probing signal where the advantage of a 160 sample repetition length is largely negated. Besides, the addition of these frequencies will create a transmit signal incompatible with that of V.34.

Addition of frequency information to the 600 bps PCM downstream modulation signal, though, can be used to yield favorable benefits. Except during probing, the answer modem produces transmit signals in the range of 1800 Hz (guard tone) and in the frequency band of 1800 Hz to 3000 Hz (QAM). The call modem produces transmit signals in the frequency band of 600 Hz to 1800 Hz (QAM). As such, the frequencies from 0 Hz to 600 Hz and 3000 Hz to 4000 Hz are available for additional discovery signals.

Bandlimited signals of known sequences from 0 Hz to 600 Hz and from 3000 Hz to 4000 Hz can be used to provide additional information about the channel spectrum. This additional information, together with that from probing, can be used to provide a quite accurate model of the PCM downstream channel before Phase 3 signaling.

The addition of known very low frequencies in the PCM downstream channel, say from 25 Hz to 100 Hz inclusive, can also be used to determine the nature of the low frequency induced analog channel harmonic distortion.

D. Additional PCM Downstream Considerations

To provide the maximum benefit for PCM downstream channel probing, the V.34 compatible Phase 2 PCM signals should be strictly sample synchronous and explicit arithmetic operations for both probing and QAM signals. With a symbol rate of 600 symbols per second, a modulation carrier of 1200 Hz or 2400 Hz, and an optional guard tone of 1800 Hz, all signals can be specified exactly as sequences of 40 samples. If the QAM modulation, including the symbol to carrier/guard tone phase relationship is explicitly specified, recoding identification and primary to secondary symbol set transformation can be extended over all Phase 2 PCM downstream signals.

This approach appears extreme in respect to the philosophy adopted by existing modem specifications (V.22, V.32, V.34 etc.) but is compatible with both the description of later PCM modem downstream information and other voice specifications. For example, digital speech specifications explicitly specify their transmitter arithmetic to guarantee interoperability. V.34 also explicitly specifies its arithmetic, for the same reasons, in its preceding operation. Explicitly specifying the arithmetic of the Phase 2 PCM downstream signals is an extension of these approaches.

It should be appreciated that the same benefits could be gained by similarly specifying the Phase 2 upstream signals. In particular, sample synchronous signaling on all Phase 2 PCM downstream signals would allow the accurate recovery of the PCM sample clock and hence a PCM sample clock synchronous upstream signal. Sample synchronous signally can then be discovered and used for both improved V.34 upstream and full duplex PCM upstream signaling, in Phase 2 and subsequent Phase 3 signaling. The use of this synchronized transmit clock to the PCM sample stream allows improved PCM downstream echo cancellation and adaptation of PCM quantization effects, as well as other benefits.

Other specifications may include locking of the upstream sample clock to a recovered Phase 2 or earlier signal. The locking of the upstream sample clock requires that some signal (Phase 1 ANS/ANSam, Phase 2 carrier, symbol and/or probing) is sample synchronous. At its most radical extension, Phase 1 and Phase 2 signals could be used to synchronize all transmit clocks to an originally unknown network clock source. The FSK (frequency shift keying) modulated signals used by Phase 1 could be generated by the same techniques suggested for the Phase 2 QAM modulated signals.

E. Illustration of a PCM Representation of a Probing Tone Ensemble

The probing tone ensemble used by V.34 consists of cosines consisting of most frequencies in multiples of 150 Hz from 150 Hz to 3750 Hz. By altering the phase relationship of certain frequencies by 180° additional channel properties can be detected as suggested in U.S. Pat. No. 5,515,398.

For a PCM modem, all of the signals sent, including the probing tone ensemble, are limited to PCM codes. The probing tone ensemble generated by a PCM modem would be mapped from a linear representation to PCM codes. The probing tone ensemble can be used for probing of a channel for PCM characteristics as discussed infra. By specifying an exact PCM code representation of the probing tone ensemble, the sending and receiving PCM modems can use the probing tone ensemble for V.34 probing algorithms in case of fallback or other properties and can use the knowledge of exact PCM codes sent for PCM channel probing purposes.

Further, minor adjustments to the PCM sequence representing the probing tone ensemble can be performed to a) include additional PCM codes in the sequence, b) probe for additional frequencies including low and high frequencies and DC. Methods to include additional PCM codes in the sequence include, but are not limited to the following: 1) time shift the starting point of the probing tone ensemble, 2) alter the standard amplitude of the probing tone ensemble, 3) adjust the amplitude of the probing tone ensemble slightly over time, 3) extend the frequencies being probed by the addition of frequencies below 150 Hz and above 3600 Hz, 3) add a DC offset to the probing tone ensemble, and 4) dither of the least significant bit of selected PCM codes.

Specifically, using $\mu$Law PCM coding, the two segments of the V.34 probing tone ensemble L1 and L2 at the standard nominal power levels comprise the following number of unique symbols and unique magnitude symbols:

| | | |
|---|---|---|
| L1 | 48 unique symbols | 34 unique magnitudes |
| L2 | 48 unique symbols | 35 unique magnitudes |
| Combined L1 & L2 | 84 unique symbols | 57 unique magnitudes |

By including an initial time shift of 1/150 Hz×1/3600= 18.518 μsec, L1 and L2 comprise the following number of unique symbols and unique magnitude symbols:

| | | |
|---|---|---|
| L1 | 81 unique symbols | 54 unique magnitudes |
| L2 | 79 unique symbols | 52 unique magnitudes |
| Combined L1 & L2 | 129 unique symbols | 80 unique magnitudes |

The time shifted set of PCM codes includes almost all of the large amplitude PCM codes, many of the middle amplitude PCM codes and a scattering of the small amplitude PCM codes. By a simple operation of dithering selected PCM codes, additional small amplitude PCM codes can be created without any significant effect on the salient characteristics of the probing tone ensemble for V.34 purposes.

Phase 3 and Phase 4 Signaling

In light of the preceding discussion, an analog PCM modem receiver, with the proper Phase 2 signaling, can use a much-simplified subsequent Phase 3 signaling. In particular, the main tasks of subsequent discoveries can be summarized as:

A. Receive symbol timing resynchronization
B. Complete primary to secondary symbol set transformation
C. Final analog channel spectrum estimation
D. Analog noise spectrum estimation While it is recognized that some implementations of the analog PCM receiver may not require determining the spectrum of the channel or of the noise, (it may be implicit in the design of the channel equalizer), other implementations can use this information to anticipate the effects of a different PCM downstream transmit spectral shaping implemented in the digital PCM modem after final training.

An ideal training sequence appears to be one that has the following characteristics:

A. Leading sample resynchronization signal
B. Bandlimited full symbol set transformation signal
C. Near full spectrum symbol limited training signal
D. Second near full spectrum symbol limited training signal As before, each of these signals, their use and purpose, are described separately below.

A. Sample Resynchronization

Since the characteristics of the sample timing recovery have been previously discovered in Phase 2, the only requirement of this signal is to provide phase information for subsequent signaling.

B. Bandlimited Full Symbol Signal

A bandlimited full-symbol signal is used to complete and verify the preliminary determination of the PCM primary to secondary symbol set transformation. It ideally is bandlimited from 250 Hz to 3750 Hz or even 500 Hz to 3500 Hz to allow quick and accurate identification of all transformations not discovered in the previous Phase 2 discovery. (Other bandlimits may be suitable or appropriate.)

It is known that sequences whose circular correlation is an impulse produce fast convergence of adaptive receiver mechanisms. The V.34 PP sequences as well as, in a special sense, the V.34 probing sequence possesses these characteristics. As such, selection of a sequence with these properties provides advantages for the quick completion of this discovery process. Furthermore, most sequences with this property can be designed to have favorable peak to RMS properties.

Bandlimiting the spectrum of this signal provides for accurate discovery without the effect of slow convergence (due to inadequate channel response) and distorting affects (harmonic distortion).

Assuming a sequence is approximately 256 symbols long, it would take only 32 ms to transmit one repetition. If at least 6 repetitions are used, only 192 ms of training will have passed.

Because of the need for accurate robbed bit signaling identification, it is recognized that sequences should not be a multiple of 6 for maximum effectiveness.

C. Near Spectrum Symbol Limited Signal

All later training should use a near full spectrum-training signal. The symbols themselves can be drawn from a small set of possible symbols to allow robust reception of post training information.

This training signal should be near full spectrum. A fully white spectrum has the disadvantages of possible post training reception errors because of the channel spectral nulls and incomplete channel characteristics because of the presence of harmonic distortion. Alternately, rather severe reduction of the PCM transmit spectrum results in slow convergence of the analog PCM receiver adaptive components. In a preferred embodiment, it is desirable that a small number of spectral choices be made available, where their determination is made from the Phase 2 discoveries and communicated from the analog PCM modem to the digital PCM modem during the INFO1 packet at the end of Phase 2.

The specification of a fixed small transmit symbol set may be undesirable, just that the symbol set used for a particular symbol should be small. Most proposed transmit spectral shaping methods using bit redundancy tend to concentrate transmit energy into a few tones when the transmit symbol set is small. A simple symbol set syndrome generator can be used to prevent this undesirable situation from happening.

D. Second Near Spectrum Symbol Limited Signal

The preceding discussion has described Phase 3 signals. Because the use of the noise spectrum may be needed before determining the proper PCM downstream transmit spectral shaping and symbol spacing, it may not be possible to specify a different Phase 4 training signal. While the use of the Phase 3 training signal may not be ideal, it may have to be used for Phase 4 because of this inadequate information. If desired, though, the J sequence of the analog receive modem can be logically extended (it is based upon the V.32 rate sequence) to include additional Phase 4 PCM downstream spectral shaping options.

Post Phase 4 Signaling

The preceding description has focused only on discovery concerns. Implicit to the description, though, are the assumptions that:

A. There is a communication of parameters from the analog PCM modem the digital PCM modem; and
B. The discoveries are complete at the end of Phase 4.

It has been found that these two assumptions are essentially correct. It has been observed, though, that:

A. Full transformation discovery statistically may require more information than can be reasonably communicated in the Phase 4 upstream channel. Furthermore, incomplete communication of this information can yield as much as a 1K reduction in throughput.

B. The analog PCM receiver may not have fully discovered the channel characteristics selected at the end of the Phase 4.

It is recommended that a secondary information phase be considered. This can be implemented in two forms of seamless renegotiation: (1) short (which is speed selection only) and (2) long (speed and additional primary channel transformations).

This would allow initial connections at possibly slightly sub-optimal speeds and the rapid reconfiguration to higher throughput rates as more accurate information becomes available. For analog PCM modems with complete primary to secondary set discovery mechanisms, these modems would immediately request a long seamless renegotiation to send additional information to the digital PCM modem. The rate used, though, would be at the higher post Phase 4 upstream rate, not the slower rate of Phase 4 signaling.

Improvements to Echo Canceller Training

An improvement to the echo canceled training process is to "whiten" the upstream signal. Specifically, additional outband signals are inserted in the transmitter to allow for faster convergence of the reflected local echo of the analog PCM modem receiver. The insertion of this signal need only be present during Phase 3 training. This technique does not seem to affect any existing V.34 implementations as the training reference signal that is expected by the other modem's receiver would only see a small increase in noise, most of which would be out of band.

In summary this patent describes and claims several methods that aid in the discovery processes necessary within an analog PCM receiver. These methods include:

Phase 2

A. Requiring some or all Phase 2 PCM downstream signals as sample synchronous.

B. Explicitly specifying the arithmetic used when generating some or all of the Phase 2 PCM downstream signals.

C. Inclusion of additional Phase 2 PCM downstream outband signals which will not affect V.34 connectivity but can be used for better channel spectral estimation and harmonic distortion detection.

D. Possible analogous specification of the upstream Phase 2 signals for additional benefits in the digital PCM echo canceller or future full duplex PCM applications.

Phase 3/Phase 4/Post Phase 4

A. Short leading resynchronization signal.

B. Bandlimited large symbol set for final digital impairment discovery. The symbol sequence should be of fixed length, preferable not a multiple of 6, and preferably one of the known sequences such that its circular correlation is an impulse.

C. Near full spectrum second training signal. The PCM downstream transmit spectrum shaping is determined and communicated in Phase 2. The symbols are selected to have large intersymbol distances.

D. Second near full spectrum Phase 4 second training signal. In all aspects same as Phase 3 signal with optional secondary transmit spectral shaping applied.

E. Provision for alternate seamless renegotiation frames for communication of potentially extensive analog PCM receiver discoveries to the digital PCM transmitter.

The use of any of these methods shortens the PCM modem connection time while possibly increasing throughput of the PCM downstream signal through better discovery within the analog PCM modem. The Phase 2 methods, in particular, are easy to specify, to implement, and they preserve the goal of V.34 interoperability.

This patent also provides a method of providing improved echo canceller training of a modem.

In accordance with one preferred embodiment, characteristics of a PCM channel may be discovered in a manner that maintains compatibility with modems using a non-PCM standard. As shown in FIG. 1, a first modem which is a digital PCM modem creates a PCM representation of an analog signal that is compatible with a non-PCM modem standard (12). As described above, an example of such an analog signal is the V.34 Phase 2 probing tone signal. The first modem then transmits the PCM representation of this signal to a second modem. If the second modem is a PCM modem, then when the PCM representation of the signal is received (16), the signal is processed as a PCM signal to determine characteristics of the PCM channel (18). On the other hand, if the second modem is a non-PCM modem, then when the PCM representation of the signal is received (20), the signal is processed in accordance with the non-PCM standard of the second modem (22).

In accordance with a second preferred embodiment, characteristics of a PCM channel between an analog PCM modem and a digital PCM modem may be discovered. Initially the digital PCM modem transmits a sample synchronous signal to the analog PCM modem (30). The analog modem synthesizes a recovered network clock from the sample synchronous signal (32). A representation of a signal is then transmitted from the analog PCM modem to the digital PCM modem using the recovered network clock as a timing reference (34). The representation of the signal is received at the digital PCM modem (36), and is processed to determined characteristics of the PCM channel (38).

Thus, it is seen that the objects of the invention are efficiently obtained. Modifications and improvements of the methods described herein should be readily apparent to those having ordinary skill in the art.

We claim:

1. Method of discovering characteristics of a PCM channel using signals compatible with non-PCM modems, comprising:

creating in a first PCM modem a PCM representation of an analog signal that is compatible with a non-PCM modem standard;

transmitting said PCM representation of said signal from said first PCM modem to a second modem;

receiving said PCM representation of said signal by said second modem; if the second modem is a PCM modem, processing said PCM representation of said signal in said second modem as a PCM signal to determine characteristics of said PCM channel; and if the second modem is a non-PCM modem compatible with said non-PCM modem standard, processing said PCM representation of said signal in accordance with said standard.

2. A method of discovering characteristics of a PCM channel as recited in claim 1, wherein creating a PCM representation of said signal comprises:

creating a linear representation of said signal; and, mapping said linear representation of said signal to PCM codes to form said PCM representation of said signal.

3. A method of discovering characteristics of a PCM channel as recited in claim 1, wherein creating a PCM representation of said signal comprises:

adding a predetermined time shift to said signal to form a modified signal, creating a linear representation of said modified signal; and mapping said linear representation of said modified signal to PCM codes to form said PCM representation of said signal.

4. A method of discovering characteristics of a PCM channel as recited in claim 1, wherein creating a PCM representation of said signal comprises:

multiplying said signal by a gain scaling factor to form a modified signal, creating a linear representation of said modified signal; and mapping said linear representation of said modified signal to PCM codes to form said PCM representation of said signal.

5. A method of discovering characteristics of a PCM channel as recited in claim 1, wherein creating a PCM representation of said signal comprises:

including additional frequencies in said signal to form a modified signal, creating a linear representation of said modified signal; and mapping said linear representation of said modified signal to PCM codes to form said PCM representation of said signal.

6. A method of discovering characteristics of a PCM channel as recited in claim 1, wherein creating a PCM representation of said signal comprises:

adding a constant DC factor to said signal to form a modified signal, creating a linear representation of said modified signal; and mapping said linear representation of said modified signal to PCM codes to form said PCM representation of said signal.

7. A method of discovering characteristics of a PCM channel as recited in claim 1, wherein creating a PCM representation of said signal comprises:

creating a linear representation of said signal;

mapping said linear representation of said signal to PCM codes forming preliminary PCM representation; and dithering selected PCM codes in said preliminary PCM representation to form said PCM representation of said signal.

8. A method of discovering characteristics of a PCM channel as recited in claim 4, wherein said PCM representation of a signal is compatible with analog modem standard V.34.

9. A method of discovering characteristics of a PCM channel as recited in claim 1, wherein said signal comprises a modulated signal.

10. A method of discovering characteristics of a PCM channel as recited in claim 1, wherein said signal comprises a probing tone ensemble, where said probing tone ensemble comprises one or more tones.

11. A method of discovering characteristics of a PCM channel as recited in claim 1, wherein said signal comprises a QAM modulated signal.

12. A method of discovering characteristics of a PCM channel as recited in claim 1, wherein said signal comprises an FSK modulated signal.

13. The method in claim 1, wherein said second modem processes said PCM representation of said signal as a PCM signal when said second modem is ready to receive said PCM representations and processes said PCM representation as an analog signal otherwise.

14. The method in claim 1, wherein said second modem processes said PCM representation of said signal as a PCM signal and as an analog signal.

15. A method of discovering characteristics of a PCM channel between an analog PCM modem and a digital PCM modem, comprising:

transmitting a sample synchronous signal to said analog PCM modem wherein said sample synchronous signal is a PCM representation of an analog signal that is compatible with a non-PCM modem standard;

synthesizing a recovered network clock from said sample synchronous signal;

transmitting a representation of a signal from said analog PCM modem to said digital PCM modem;

receiving said representation of said signal by said digital PCM modem; and, processing said representation of said signal to determine characteristics of said PCM channel.

16. A method in an analog PCM modem, comprising:

receiving a sample synchronous signal transmitted through a PCM channel by a digital PCM modem wherein said sample synchronous signal is a PCM representation of an analog signal that is compatible with a non-PCM modem standard;

synthesizing a recovered network clock from said sample synchronous signal; and transmitting a representation of said sample synchronous signal from said analog PCM modem to said digital PCM modem.

17. The method in claim 16, wherein said representation of said sample synchronous signal is selected from the group consisting of signal samples, a processed signal, an indication of signal characteristics, and an indication of signal acceptability.

18. A method of discovering characteristics of a PCM channel using signals compatible with non-PCM modems, comprising:

creating in a first PCM modem a PCM representation of an analog signal that is compatible with a non-PCM modem standard; and transmitting said PCM representation of said signal from said first PCM modem to a second modem, such that if the second modem is a PCM modem, the PCM representation of the signal may be processed in the second modem as a PCM signal, and if the second modem is a non-PCM modem compatible with said non-PCM modem standard, the PCM representation of the signal may be processed in accordance with said non-PCM modem standard.

19. The method in claim 18, wherein said second PCM modem processes said PCM representation as an analog signal.

20. A method of discovering characteristics of a PCM channel using an analog signal, comprising:

creating in a first PCM modem a PCM representation of an analog signal; and transmitting said PCM representation of said analog signal from said first PCM modem to a second PCM modem, wherein if said second PCM modem is ready to receive PCM, said PCM representation of said analog signal may be processed in said second PCM modem as a PCM signal, and if said second PCM modem is not ready to receive PCM, said PCM representation of said analog signal may be processed as an analog signal.

* * * * *